Fig.1

Sept. 27, 1966     B. E. STENTZ ET AL     3,275,393
HOT AND COLD FOOD SERVICE CART
Filed Oct. 13, 1959     5 Sheets-Sheet 3

INVENTORS
BLAIR E. STENTZ
BY WILLIAM R. CONKLIN
Owen & Owen
ATTORNEYS

Sept. 27, 1966    B. E. STENTZ ETAL    3,275,393
HOT AND COLD FOOD SERVICE CART
Filed Oct. 13, 1959    5 Sheets-Sheet 4

INVENTORS
BLAIR E. STENTZ
BY WILLIAM R. CONKLIN
Owen & Owen
ATTORNEYS

United States Patent Office 3,275,393
Patented Sept. 27, 1966

3,275,393
HOT AND COLD FOOD SERVICE CART
Blair E. Stentz and William R. Conklin, Murfreesboro, Tenn., assignors, by mesne assignments, to United Service Equipment Co., Inc., Palmer, Mass., a corporation of Delaware
Filed Oct. 13, 1959, Ser. No. 846,159
16 Claims. (Cl. 312—214)

This invention relates to food service carts of the type employed in hospitals or similar institutions where meals are served at locations remote from central cooking facilities and to carts adapted for use in serving meals to passengers on large air liners. More particularly, the invention relates to an improvement in such food service carts whereby trays for individual patients may be completely assembled with both hot and cold foods in place on the trays when they are initially loaded into the food service carts.

It has been customary in the design and construction of food service carts for the cart to be divided into hot and cold compartments. One or more of these compartments, usually a cold compartment, is filled with trays upon which the central food preparing personnel have assembled the cold elements of the meal such as salads, desserts, bread and butter, etc. Hot foods such as the main meat and vegetable dishes are placed on individual service plates which are then all placed in a heated compartment. Inasmuch as the main kitchen of the institution is the location where suitable combinations of dishes are designed for each individual meal, for example, in accordance with the need of a patient, it is necessary for the server to make up each meal by selecting proper hot dishes from the hot compartment and placing them on a tray separately removed from the cold compartment.

Another method of food service at remote locations has been to utilize food service carts having hot and cold compartments and to place food in the compartments in bulk quantities. This method of service requires that the food server make up plates and dishes of foods according to diet instructions for each patient by selecting servings from the bulk quantities and assembling the servings of the correct foods upon each tray.

The service of foods to passengers on large aircraft has usually been carried out by a slightly different procedure. Trays are made up at "flight kitchens" on the ground with the cold food items assembled thereon, and the trays are inserted in insulated containers. At the same time, hot foods are placed in small casserole type dishes and all of the hot dishes for all of the trays are inserted in insulated hot containers. The several separate hot and cold containers and separate hot and cold beverage containers are placed in racks in the aircraft by ground personnel. At meal time it is necessary for the stewardess to spend considerable time in the "galley" taking the trays from the cold containers and the hot dishes from the hot containers, and placing one or more upon each of the individual trays.

The stewardess must then carry the trays, usually not more than two at a time, to the passengers, no matter where they are seated in the aircraft, and then return to the galley for the next pair of trays. Because of the possibility of sudden movement of the aircraft, the stewardess usually does not serve beverages on the trays with the meals, but passes down the aisle serving beverages after all of the passengers have received their meals. After the passengers have finished their meals, the stewardess must again take the tray from the passengers' seats back to the galley. As a result of this system, the stewardess makes at least one round trip from the galley to each passenger's seat in order to serve and remove his tray. The problems inherent in this system of food service are becoming more and more acute as the size of aircraft and the number of passengers carried increases and as the higher speed of new aircraft shortens the time between ports during which the meal can be served.

It is the object of the present invention to provide a food service cart having hot and cold compartments so arranged relative to each other that a plurality of individual trays each containing an assembly of both hot and cold dishes may be inserted into the cart at a central food preparation location with both hot and cold dishes properly placed according to diet requirements and both the hot and cold dishes kept at appropriate temperatures during delivery to the remote locations, so that a server can simply remove each tray from the cart and need not assemble the dishes to the tray at the time of removal from the cart.

It is another object of the instant invention to provide a food service cart having hot and cold compartments so arranged relative to each other that a plurality of individual, divided trays, each containing both hot and cold foods, may be placed in the cart at a "flight kitchen" located at one of the airports at which the aircraft calls and the entire cart containing a number of complete meals already placed on their individual service trays may be put into the aircraft by the ground personnel; the cart being so designed that the stewardess pushes the cart along the aisle of the aircraft, serving each passenger a complete meal directly from the cart which contains both hot and cold compartments and with any one of several beverages, a supply of which is also available in each cart. This modification of the invention also provides for quick and easy removal of passengers' trays after they have completed their meals, the stewardess again moving the cart the length of the aircraft and reinserting the trays into the cart as she proceeds from seat to seat.

It is another object of the invention to provide a hot and cold food service cart utilizing a compartmentalized tray wherein cold dishes for each meal are placed in a certain location on the tray and hot dishes for each meal placed in a different portion thereof, the cart being thermally divided to form hot and cold zones for the hot and cold sections of the trays.

It is yet another object of the instant invention to provide a hot and cold food service cart capable of maintaining a plurality of individual meal service trays with both the hot and cold foods in place on the trays and with both foods being kept at their proper temperatures.

Other and more specific objects and advantages of a food service cart embodying the instant invention will be better understood from the following specification and from the drawings, in which

FIG. 6 is a fragmentary simplified plan view of a large aircraft illustrating how hot and cold food service carts embodying the invention are placed in the aircraft and moved along the aircraft during and after food service.

FIG. 7 is a view in perspective, in general similar to

FIG. 1, but illustrating a modification of a cart embodying the invention as designed for food service to passengers in an aircraft.

A hot and cold food service cart generally indicated at 20 has a generally rectangular cabinet 21, a base frame 22 which is mounted upon a plurality of caster wheels 23, a handle 24 and means dividing the cabinet 21 into several compartments. A cart 20 embodying the invention may also be provided with one or more beverage wells generally indicated at 25 and each having a suitable spigot 26, for the storage and delivery of beverages along with the meals served at locations remote from the food preparation center.

In the embodiment of the invention illustrated in FIGS. 1-5 the cart 20 has two main compartments 27 and 28. Each of the compartments 27 or 28 is provided with a door 29 or 30, respectively, and each is adapted to contain a number of individual food service trays 31. In the embodiment of the invention shown, each of the compartments 27 and 28 can store ten food service trays 31. The cart 20 also has a mechanical refrigeration system located in a compartment generally indicated at 32 and may have one or more drawers 33 for extra silverware, napkins, condiment containers, etc.

The walls of the cabinet 21 and its doors 29 and 30 have double walls which enclose a layer of thermal insulation 34 (FIG. 3) fabricated from suitable material such as glass fiber wool. Similar thermal insulation 35 may be located circumjacent the beverage containers 25 which may contain either hot or cold liquids or both.

Each of the food service trays 31 is longitudinally divided by a rib 36 to form a cold section 37 and a hot section 38 of unequal areas. The relative size of the cold section 37 and hot section 38 is determined by the number and size of food service plates most frequently needed for serving a meal to the remotely located persons, for example the patients in a hospital. In the tray shown in the drawings the cold section 37 is substantially smaller than the hot section 38 because the main items of the meal are carried upon a dinner size plate 39 which requires more area than the cold portions of the meal, for example a salad plate 40, dessert plate 41 and bread and butter plate 42. If the dessert to be served with a meal were a hot dessert then the dessert plate 41 would be placed in the hot section 38 of the tray 31 along with the main plate 39. In any event the trays 31 are made up at the central food preparation station with the appropriate hot and cold foods in their respective dishes placed in the proper sections of the tray 31 according to their temperatures. If the diner is to have a hot beverage, then its container, for example a cup and saucer 43, is placed upon the tray 31 in the hot section 38. If the beverage is to be cold, then its container is placed in the cold section 37. The server at the remote location fills the beverage containers with suitable beverages drawn from the spigots 26. The delivery of the beverages in bulk to remote locations has been found to be preferable to the making up of the individual servings of the beverage at the central food preparation station, in order to minimize the likelihood of spillage.

Figure 1:
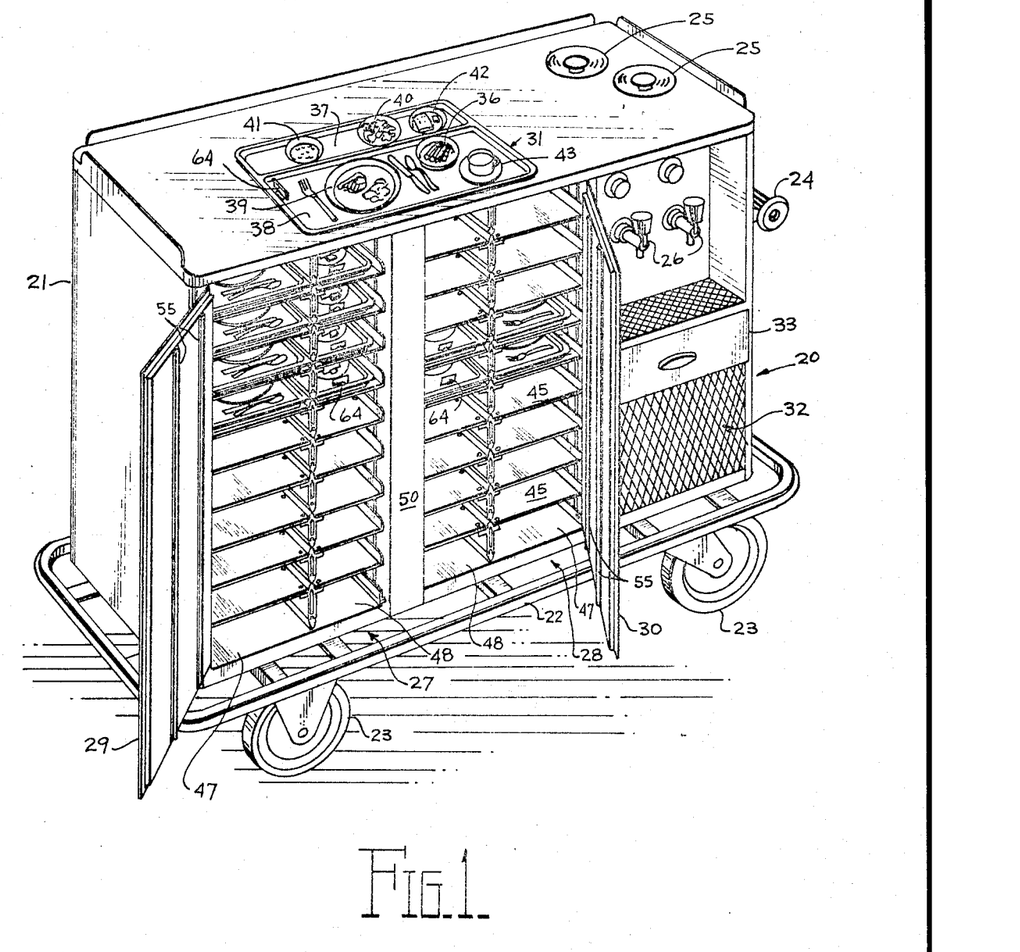
FIG. 1 is a view in perspective of a food service cart embodying the invention, showing a number of special compartmentalized hot and cold food trays in place in the cart.
Figure 2:
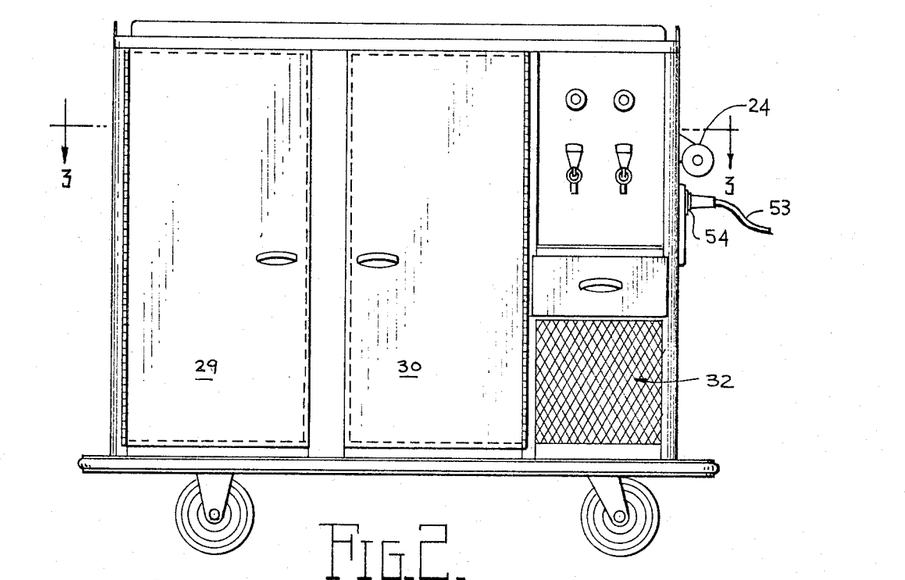
FIG. 2 is a front view in elevation of the cart shown in FIG. 1.
Figure 3:
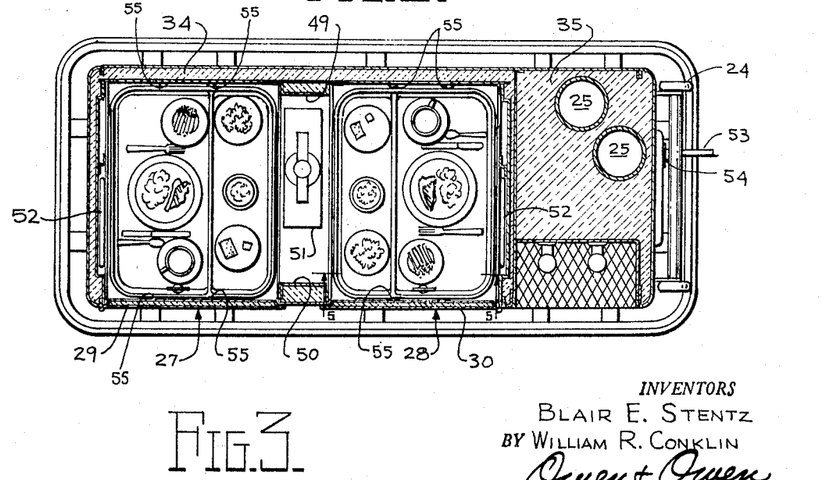
FIG. 3 is a horizontal sectional view taken along the line 3—3 of FIG. 2.
Figure 4:
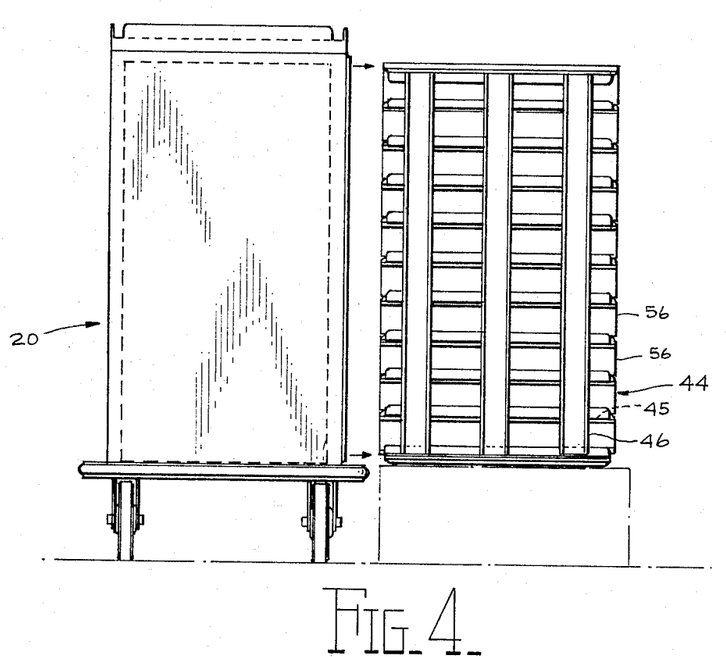
FIG. 4 is an end view in elevation taken from the left side of FIG. 2 and illustrating a cart embodying the invention with its tray racks removed for cleaning or other purpose.

A rack 44 (FIGURE 4) is provided for each of the compartments 27 and 28. The rack 44 (FIGURE 4) comprises a plurality of horizontal shelves 45, each of which is designed to receive a single food service tray 31 and side support channels 46 (FIGURE 4). The rack 44, as a unit, may be removed from and inserted into either of the compartments 27 or 28 through the openings provided when the doors 29 and 30 are swung widely open. When the racks 44 are removed, the interiors of the compartments 27 and 28 are free of obstruction and cleaning is facilitated.

In the food service cart illustrated in FIGS. 1-5, outer zones 47 of each of the compartments 27 and 28 are hot zones and inner zones 48 of the compartments 27 and 28 are cold zones. The two compartments 27 and 28 are vertically separated by two central pillars 49 (FIGURE 3), at the rear, and 50, at the front. The two pillars 49 and 50 function as structural elements for the cart 20 and also to enclose evaporator coils 51 (FIGURE 3), of the refrigeration apparatus which is mounted in the compartment 32. At the outer ends of the compartments 27 and 28 each is provided with a heating coil 52 (FIGURE 3), energized by electrical current leading to the cart through a cable 53 (FIG. 2) removably plugged into a suitable receptacle 54 on the end of the cart near the handle 24. Electric current for the operation of the refrigerator equipment is also carried to the cart by the cable 53.

Figure 5:
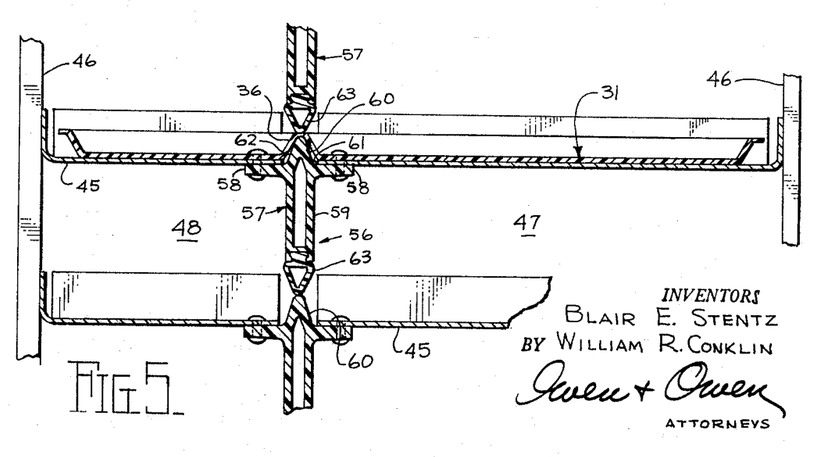
FIG. 5 is a fragmentary, vertical, sectional view taken substantially along the line 5—5 of FIG. 3 and showing thermal barrier means between hot and cold compartments of a food service cart embodying the invention.

Thermal barriers between the hot zones 47 and cold zones 48 of the two compartments 27 and 28 comprise non-conducting strips 55 (FIGURE 3) mounted on the inner surfaces of the doors 29 and 30 and thermal dividers 56 (FIG. 5) extending vertically through the spaces between superimposed shelves 45 of the rack 44 (FIGURE 4). Each of the thermal dividers 56 comprises a T-bar 57 having arms 58 secured to the under side of the next upper shelf 45, a vertical web 59 and an upwardly extending rib 60. The rib 60 protrudes vertically through a slot 61 in the respective shelf 45 and is engaged by a groove 62 at the under side of the tray rib 36 of a tray 31 placed on the particular shelf 45. Each of the T-bars 57 is hollow to add to its thermal insulation property and may be an extruded section of thermally non-conductive material such as a synthetic rubber or other synthetic resinous material. The material from which it is formed should be relatively stiff. Each of the thermal dividers 56 also includes a softer, hollow, sealing bar 63 removably secured on the bottom of its respective T-bar 57 and extending horizontally along at such level as to engage the upper end of the next lower T-bar rib 60 when no tray is in place on the corresponding shelf 45, or to be deformed upwardly and remain in thermal sealing contact with the upper surface of a tray rib 36, when the tray 31 is in position on the corresponding one of the shelves 45. The contact of the bar 63 with its cooperating rib 60 in the absence of a tray 31, is shown at the bottom of FIG. 5 and the cooperation of the T-bar rib 60 with the rib 36 of a tray 31 and the sealing bar 63 to form a thermal seal when a tray 31 is in place, is illustrated at the upper part of FIG. 5. The location of the strips 55 on the compartment doors 29 and 30 is such that they are pressed into engagement with the front edges of the dividers 56 when the doors 29 and 30 are closed (FIG. 3) to complete the thermal barrier between the outer hot zones 47 of the compartments 27 and 28 and the inner cold zones 48 thereof.

By thus reversing the positions of the hot and cold zones 47 and 48 of the compartment 27 with respect to the hot and cold zones 47 and 48 of the compartment 28, the cold zones are located adjacent each other so that a single refrigerator coil 51 can cool the two cold zones 48. In the arrangement illustrated in FIGS. 1 and 3, the racks 44 which mount the thermal barriers 56 are removable from the two compartments 27 and 28. They may be reversed and reinserted with the wider areas at the center of the compartments 27 and 28 and with the narrower areas at the outer sides. This reverses the sizes of the hot and cold zones 47 and 48, the larger zones now being cold zones and the smaller zones being the hot zones. Such a reversal is desirable, for example during the hot weather, when the major component of each meal may be a salad or cold plate. Under either arrangement of racks 44, the trays 31 can only be inserted with their corresponding hot and cold sections in the hot and cold zones 47 and 48.

When the food service cart 20 is located in the central food preparation station the dietitians or kitchen personnel make up a tray 31 for each of the indicated patients to be served from a particular cart 20. Hot and cold foods according to plan are properly placed upon each tray. A name plate or room number card 64 (FIG. 1) is also placed upon that end of the particular tray 31 which will be visible when the compartment doors 29 and 30 are open. During the assembly period the cart may be connected by its cable 53 to a source of electrical energy in order to maintain the hot zones 47 of the compartments 28 and 29 at an elevated temperature and the cold zones 48 thereof at a lower temperature. After these respective zones of the compartments 27 and 28 reach their indicated temperatures and have been loaded with trays properly arranged therein, the cart may be disconnected from the source of electrical energy and the zones will be held at their respective temperatures with little change during transit from the central location to a remote food service location. At the remote food service location the cart 20 may be reconnected to a source of electrical energy in order to maintain the respective temperatures in the respective zones of the compartments 27 and 28.

In the embodiment of the invention illustrated in FIGS. 6–9, a cart 65 has a generally rectangular housing 66 forming two compartments 67 and 68 which correspond to the two compartments 27 and 28 of the earlier described embodiment of the invention. The two compartments 67 and 68 of the cart 65 are arranged in end-to-end position rather than in side-by-side position as in the case of the first embodiment of the invention. A rack 69 (FIG. 8) is removably positioned in each of the compartments 67 and 68 and, like the racks 44, the racks 69 may be reversed to reverse the respective sizes of hot and cold zones in each of the compartments 67 and 68. The hot and cold zones of the compartments 67 and 68 are thermally divided from each other by thermal barriers 70 carried by the racks 69 and cooperating with two thermal strips 71 on each of doors 72 and 73 for the compartments 67 and 68. The thermal strips 71 are spaced to align with and contact the front ends of the barriers 70 when the racks 69 and barriers 70 are in their two positions.

By reason of the end-to-end relationship of the compartments 67 and 68 rather than the side-by-side relationship of the compartments 27 and 28 of the earlier embodiment of the invention, the racks 69 are positioned in the cart 65 in such a manner that both cold zones of the compartments 67 and 68 are at one side of the cart 65 and both hot zones of the two compartments 67 and 68 are at the other side of the cart 65. Thus, the cart 65 is divided into but a single cold zone which may be refrigerated by a refrigerator coil 74 and a single hot zone which may be heated by a heating coil 75. A condenser 76 for the coil 74 may be mounted beneath the body of the cart 65. As in the case of the earlier embodiment of the invention, the rectangular housing 66 and the doors 72 and 73 of the cart 65 are double walled and insulated with suitable material.

Figures 8, 9:
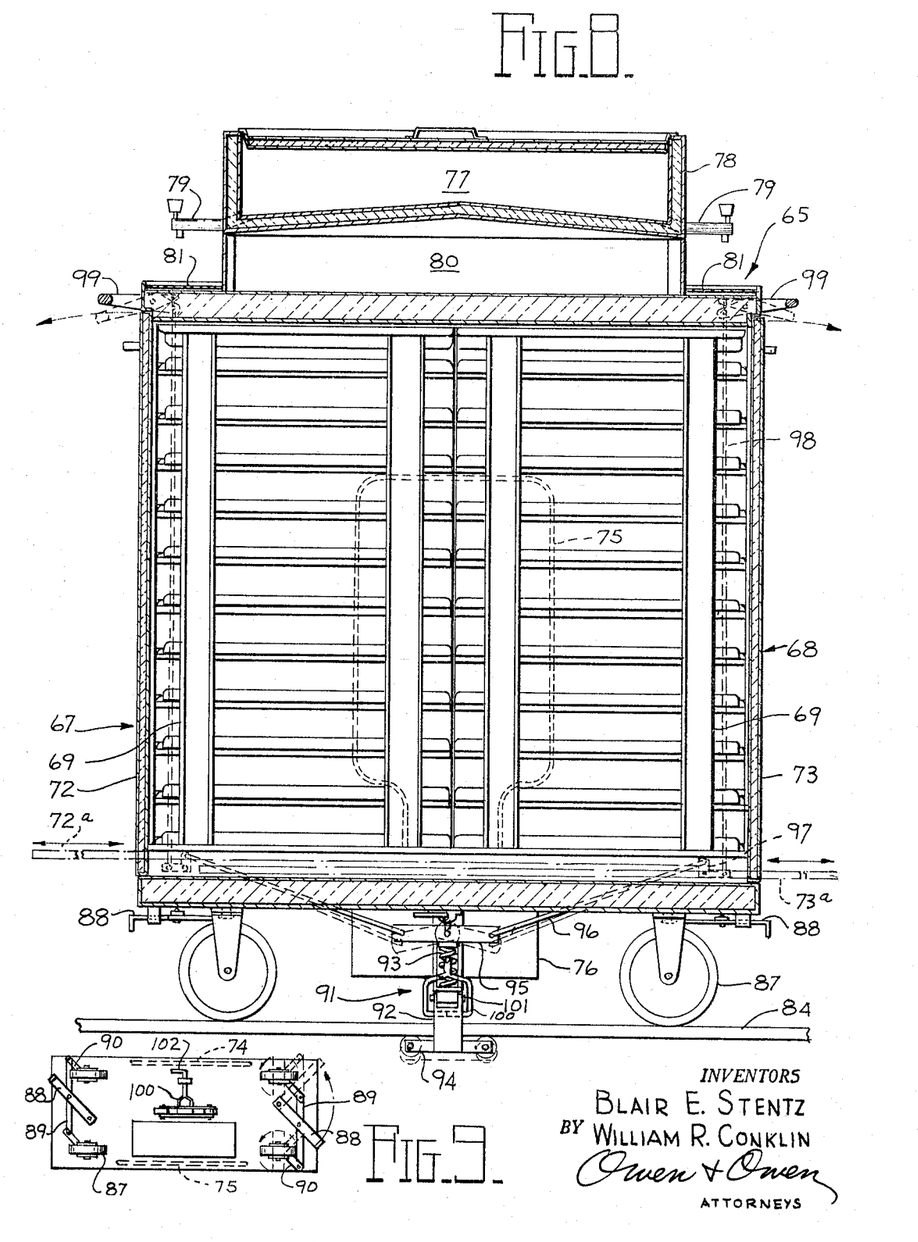
FIG. 8 is a vertical, longitudinal, sectional view taken generally along the line 8—8 of FIG. 7.
FIG. 9 is a small scale, bottom view of the modification of the cart illustrated in FIGS. 7 and 8 and showing how its caster wheels and brake means are variable to provide for movement of the cart both to and along the aisle of the aircraft.

The doors 72 and 73 of the embodiment of the invention illustrated in FIGS. 6–9 are designed to swing downwardly and outwardly from the closed or solid line position in FIG. 8, to a lower horizontal position, and then to be slid inwardly beneath the racks 69 as illustrated in the broken line position in FIG. 8, indicated by the reference numbers 72a and 73a. By thus swinging the doors downwardly and sliding them into cart 65, they are removed from positions of obstruction during the removal or insertion of trays into the compartments 67 and 68 by the aircraft stewardess. The cart 65 is illustrated in the drawings as having three beverage tanks 77 in a tank housing 78 mounted atop the main housing 66, the tanks 77 having spouts 79 at each end. The tanks 77, of course, may be insulated from each other and may have suitable heating and cooling coils as needed. An open space 80 within the tank housing 78 is provided for carrying a supply of cups and glasses into which beverages are poured from the spout 79 and placed upon each of the trays as the tray is served. A drip pan 81 is located at each end of the cart 65, beneath the spouts 79.

Figures 6, 7:
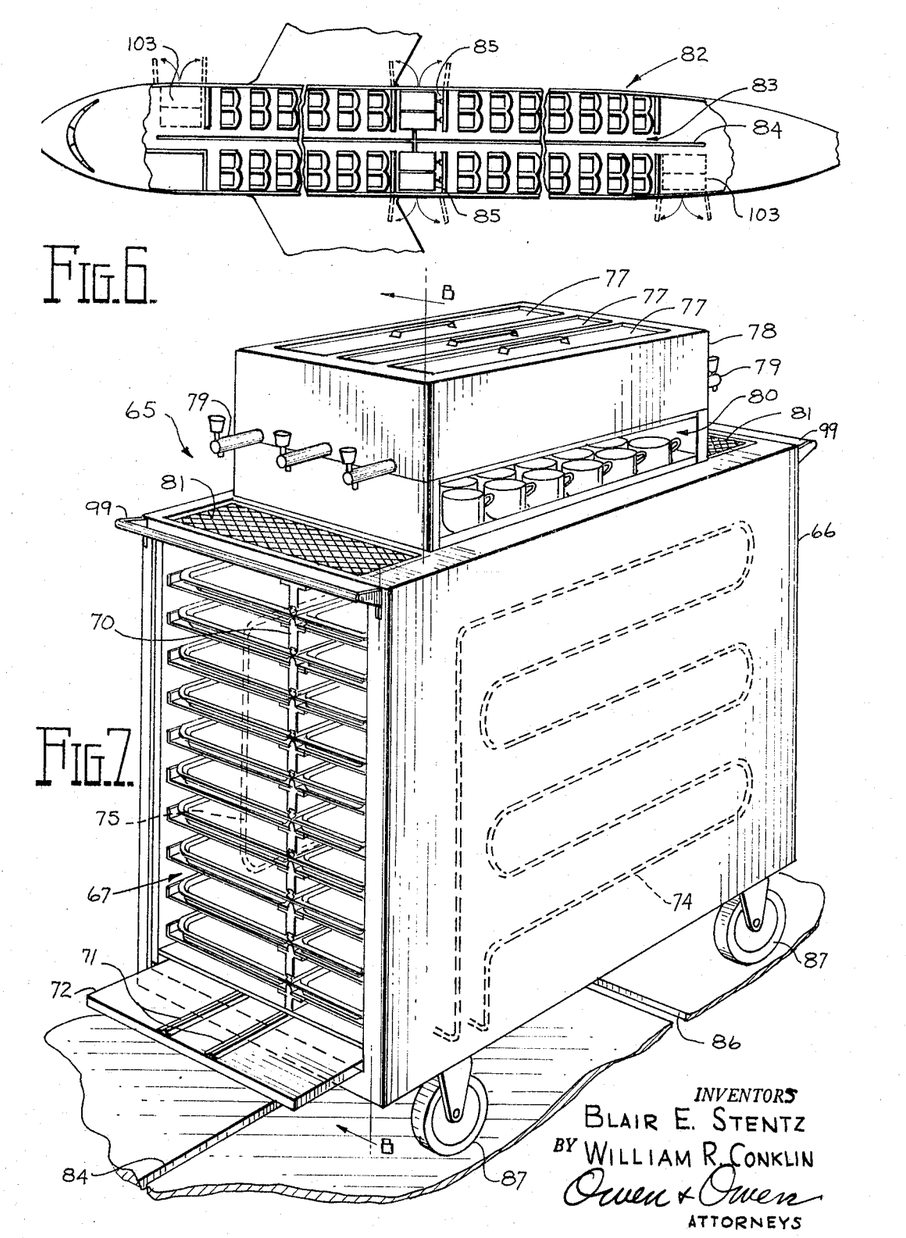

Referring now to FIGS. 6 and 9, an aircraft fuselage is generally indicated by the reference number 82. The fuselage 82 is shown as having a longitudinally extending center aisle 83 running from one end of the passenger compartment to the other. A track 84 is placed in the floor of the aisle 83. While no detail of the track construction is specifically illustrated in the drawings, it is contemplated that suitable metal flanging would be built into the primary structure of the aircraft floor with a narrow slot opening downwardly to beneath the level of the aircraft floor.

Outwardly opening compartments 85 are located at opposite sides of the fuselage 82 at approximately the middle of the fuselage 82. The compartments 85 may be opened from outside the aircraft so that a ground service crew can place a suitable number of carts 65 into the compartments 85 while the aircraft is on the ground. It will be understood, of course, that each of the carts 65 will contain a number of trays and that each tray contains a complete meal, both hot and cold items arranged upon suitable plates or other containers and placed upon hot and cold sections of the trays inserted appropriately into the compartments 67 and 68 at the "flight kitchen." Each of the carts 65 might contain, for example, 10 to 15 complete meals in each compartment 67 or 68 or a total of, say, 20 to 30 complete meals per cart. While only four carts are illustrated in FIG. 6 as being placed in the compartments 86, since the trays are inserted longitudinally into the cart 65, the carts need be only in the order of 18 inches wide so that as many as 6 or 8 carts could conveniently be placed in the two compartments 85 by the ground crew. Thus, as many as 200 meals may be provided, each completely arrayed upon its tray and each with its individual food items kept in either a hot or cold compartment as appropriate for the food item.

Side tracks 86 lead from the compartments 85 (FIG. 7) into the center of the aisle 83 and intersect the longitudinal track 84 which runs the length of the aircraft. Each of the carts 65 has four swivelable caster wheels 87 which may be swung into either of two positions in order to roll the cart sideways along the side track 86 and lengthwise along the main track 84. In FIG. 9 there is shown in a simplified form, a system of levers comprising a main lever 88, a yoke 89 and subsidiary levers 90 by which the wheels 87 are swung on vertical axes from one to the other of these two positions. The ends of the main levers 88 protrude slightly from beneath the ends of the cart 65 so that a stewardess may swing the levers 88 with her foot to twist the caster wheels 87 on their vertical axes. When the carts 65 are placed in their two main compartments 85, the wheels 87 would be swung so that the carts could be moved broadside along the track 86. When each of the carts reaches the center of the aircraft, the caster wheels 87 would be swung on their vertical axes to the other position so that the cart could be pushed along the aisle 83.

Because aircraft may take lurches or the attitude of the aircraft may change during flight from time-to-time, a locking brake is provided for the cart 65 which the stewardess may disengage in order to move the cart along the aisle 84, but which holds the cart tightly in position between movements. This brake mechanism is generally indicated by the reference number 91 in FIG. 8. The brake mechanism 91 comprises, for example, a vertically movable strut 92 normally urged upwardly by a coil spring 93. A trolley mechanism 94 is secured on the lower end of the strut 92 and bears against the under-side of the track 84. The plunger 92 may be pushed downwardly against the tension of the spring 93 to disengage the trolley 94 from the track 84 by means of linkage comprising rocking levers 95, links 96, bell cranks 97 and links 98 which connect with the inner ends of handle bars 99. There is a linkage connecting a handle bar 99 to the brake mechanism 91 at each end of the cart 65. The brake mechanism 91 has a retractor comprising a yoke 100 (FIG. 9) by means of which the strut 92 may be swung upwardly around a pin 101 (FIG. 8) to lift it and the trolley 94 above the level of the floor upon which the caster wheels 87 run. The yoke 100 is connected to a horizontally slidable handle rod 102 which is pulled to swing the strut 92 up. By thus swinging the trolley 94 above floor level, the cart 65 may be pushed along a floor in the "flight kitchen" or into the compartments 85 without damaging the brake mechanism 91.

The cart 65 embodying the invention for aircraft food service is intended to be moved along the main aisle 83 by a pair of stewardesses, one working at each end of the cart 65. For example, the stewardess preceding the cart might serve trays to passengers on the port side of the aircraft and the stewardess following the cart 65 might serve trays to the passengers on the starboard side. After each cart is emptied of its 20 or 30 meals, with the desired one of any of three beverages being served with the meal to each passenger, one of the stewardesses pulls or pushes the cart 65 to the front or rear end of the fuselage 82 where it is sidetracked into an empty cart position generally indicated in FIGURE 6 by the reference numbers 103. After each of the carts 65 is emptied of its prepared meals, a subsequent cart 65 is moved sideways out of its compartment 85 and moved along the aisle 83 for serving food to another group of passengers. After the passengers have finished their meals, the stewardesses again move the carts 65 out of their temporary storage compartments 103 and along the aisle 83, collecting the trays from the passengers ad reinserting them into the carts 65 for subsequent disposal.

A cart embodying the invention in the modification designed for aircraft food service thus provides for the preparation and assembly of complete meals at the "flight kitchen" on the ground, the delivery into the aircraft of these complete meals with the items of food kept at their appropriate temperatures until service time, eliminating the necessity for the stewardesses to assemble the meals just prior to service, and permits a group of 20 to 30 meals to be served with each pasage of the stewardesses along the aisle of the aircraft. Furthermore, a cart embodying the invention eliminates the necessity for subsequent trips for beverage service and provides great simplification in the picking up of the passengers' trays after the meals are completed.

For smaller aircraft where fewer passengers must be served, a cart generally similar to the cart shown in FIGS. 7–9 but having only one thermally divided compartment opening at one or both ends may be employed by a single stewardess in order to serve or collect, say 10 to 15 trays on each passage along the aisle. Except for size, such a single compartment cart would be substantially identical with the cart of FIGS. 7–9 and would be loaded, handled and unloaded in the manner described.

In some aircraft it may be desirable to continue delivery of the meals to the passengers by the stewardess. Under such circumstances the cart would serve as a container for the assembled meals on their trays during preparation at the flight kitchen, delivery to the aircraft and until meal time. In such case, the cart might have non-swivelable wheels or could be a container only, rather than a mobile cart and in any case, the advantages of complete meal assembly at the central kitchen plus separate temperature zones for both hot and cold food items on the meal trays are still present.

We claim:

1. A hot and cold food service cart for transporting a plurality of individual meal trays, each of said trays having a divider extending along its greater dimension for dividing the tray into hot and cold food sections, said cart having a cabinet with at least one compartment, support means in said compartment for removably supporting a plurality of trays in vertically superposed relationship with hot sections thereof above each other, thermal barrier means dividing said compartment into thermally different zones, said thermal barrier means being aligned with the dividers between the hot and cold sections of said trays when supported by said support means, a door for said compartment and temperature maintaining means for the zones of said compartment.

2. A cart according to claim 1 in which there is a refrigerating means in one of said zones.

3. A cart according to claim 1 in which the zones of said compartment have unequal horizontal areas and the trays are correspondingly divided into hot and cold sections of unequal area, the horizontal areas of said zones being compensatorily variable and the position of said tray dividers relative to said zones being correspondingly variable.

4. A cart according to claim 1 in which each of the thermal barrier means comprises a downwardly extending web having a lower edge adapted to engage the upper surface of the tray dividing rib of a lower tray when said lower tray is in place and an upwardly extending rib adapted to engage the lower surface of the tray dividing rib of an upper tray when said upper tray is in place, the lower edge of the downwardly extending web of each barrier means and the upwardly extending rib of the next lower barrier means being adapted to engage each other when no tray is positioned therebetween.

5. A hot and cold food service cart for transporting a plurality of individual meal trays, each of said trays having a divider for dividing the tray into hot and cold food sections, said cart having two tray compartments adjacent each other, support means in each of said compartments for removably supporting a plurality of trays therein in vertically superposed, spaced, relationship with similar temperature sections of the trays in each compartment above each other, thermal barrier means for each of said compartments for dividing each of said compartments into a hot zone and a cold zone, the adjacent zones of said two compartments being thermally similar, said thermal barrier means being vertically aligned in each compartment and aligned with the divisions between the hot and cold sections of said trays when supported by said support means, means for maintaining a common temperature in said adjacent zones, and doors for said compartments.

6. A food service cart according to claim 5 in which each of the thermal barrier means comprises a vertical web extending vertically across the space between and into contact with two vertically superposed trays and is deformed by insertion of said trays between adjacent barrier means, and in which each of said barrier means extends into contact with the next upper and lower ones of said barrier means when no interposed tray is present and all of said barrier means jointly lie in a common plane between the hot and cold zones of the corresponding compartment.

7. A food service cart according to claim 5 in which the hot and cold zones of each of said compartments are unequal in horizontal area, the trays have hot and cold sections of corresponding areas and the thermal barrier means extend along a vertical plane aligned with the divisions between said zones and said sections, the horizontal areas of said zones being compensatorily variable and the position of said tray dividers relative to said zones being correspondingly variable.

8. A food service cart according to claim 7 in which support means consists of a removable unitary rack having a plurality of vertically spaced tray guides which support and position said thermal barrier means, said rack being reversible in said compartment for reversing the sections of said trays in said hot and cold zones thereby reversing the sizes of the hot and cold zones.

9. A hot and cold food service cart for transporting a plurality of individual meal trays, each of said trays having a divider for dividing the tray into hot and cold food sections, said cart having two tray compartments adjacent each other in side to side relationship, support means in each of said compartments for removably supporting a plurality of trays therein in vertically superposed, spaced relationship with similar temperature sections of the trays in each compartment above each other, thermal barrier means for each of said compartments for dividing each of said compartments into a hot zone and a cold zone, the inner adjacent zones of said two compartments being thermally similar whereby said two compartments are divided into three thermally separated zones the outer two of which are also thermally similar, said thermal barrier means being vertically aligned in each compartment and aligned with the dividers between the hot and cold sections of said trays when said trays are supported by said support means, means for maintaining a common temperature in said neighboring zones, means for maintaining a common temperature in said outer two zones that is different from the temperature maintained in said neighboring zones, and doors for said compartments.

10. A food service cart according to claim 9 in which the center, neighboring zones of the two tray compartments form a single cold zone at the center of said cabinet.

11. A hot and cold food service cart for transporting a plurality of individual meal trays, each of said trays having a divider for dividing the tray into hot and cold food sections, said cart having two tray compartments in end to end relationship, support means in each of said compartments for removably supporting a plurality of trays therein in vertically superposed, spaced, relationship with similar temperature sections of the trays in each compartment above each other, thermal barrier means for each of said compartments for dividing each of said compartments into a hot zone and a cold zone, the aligned adjacent zones of said two compartments being thermally similar whereby said two compartments are divided into thermally separated zones, said thermal barrier means being vertically aligned in each compartment and aligned with the dividers between the hot and cold sections of said trays when said trays are supported by said support means, means for maintaining a common temperature in said adjacent zones, and doors for said compartments.

12. A food service cart according to claim 11 in which the hot and cold zones of said compartments are in longitudinal alignment and the thermal barrier means extend along a vertical plane dividing said cart longitudinally into a hot zone at one side and a cold zone at the other side.

13. A food service cart according to claim 11 in which the support means consists of a removable unitary rack comprising a plurality of vertically spaced tray guides and which supports and positions said thermal barrier means along a vertical plane dividing said compartment into two enclosures of unequal volume, said racks being reversible in said compartments for reversing the sizes of said hot and cold zones.

14. A method for transporting hot and cold foods to remote locations, said method comprising placing hot and cold foods in unitary holders having separate hot and cold sections, establishing and maintaining a cold zone of an area adapted to receive two of said cold sections in lateral juxtaposition, establishing and maintaining a hot zone on each side of said cold zone, each of said hot zones being of an area adapted to receive one of said hot sections, assembling a plurality of said holders in said zones with cold sections in said cold zone and hot sections in said hot zone, transporting said plurality of holders to a remote area while maintaining said cold and hot zones and said holders in said cold and hot zones, and maintaining a thermal barrier between each of said hot zones and said cold zone while said holders are therein and during and after removal of each of said holders therefrom.

15. A hot and cold food service container for storing a plurality of individual, rectangular meal trays, each having a divider for dividing the tray along its longer dimension into hot and cold food sections, said container having at least one tray compartment, a tray support means in said tray compartment for supporting a plurality of identical divided trays with the similar sections of said trays above each other, thermal barrier means mounted in said compartment along a vertical plane dividing said compartment into hot and cold zones and aligned with the dividers of said trays when said trays are supported by said support means, means for maintaining suitable temperatures in said zones and a door for said compartment.

16. In a food service cart for transporting a plurality of individual meal trays in at least one compartment, each tray being separated into hot and cold food sections by a rib; the improvement comprising thermal barrier means aligned with the tray separating ribs for dividing the compartment into thermally different zones, said thermal barrier means comprising a downwardly extending web having a lower edge adapted to engage the upper surface of the tray separating rib of a lower tray when said lower tray is in place, and an upwardly extending web adapted to engage the lower surface of the tray separating rib of an upper tray when said upper tray is in place, the lower edge of the downwardly extending web of each barrier means and the upwardly extending web of the next lower barrier means being adapted to engage each other when no tray is positioned therebetween.

References Cited by the Examiner

UNITED STATES PATENTS

| 1,669,057 | 5/1928 | Katzinger | 206—72 |
| 1,979,222 | 10/1934 | Goodwin | 219—44 |
| 2,386,368 | 10/1945 | Taylor et al. | 312—236 X |
| 2,636,797 | 4/1953 | Alheit | 312—128 |
| 2,845,780 | 8/1958 | Conklin et al. | 312—256 X |

CLAUDE A. LE ROY, *Primary Examiner.*

HORACE A. BERMAN, GEORGE L. BREHM, CHANCELLOR E. HARRIS, *Examiners.*

J. D. HALSEY, G. R. KING, *Assistant Examiners.*

Disclaimer 3,275,393.—*Blair E. Stentz* and *William R. Conklin*, Murfreesboro, Tenn. HOT AND COLD FOOD SERVICE CART. Patent dated Sept. 27, 1966. Disclaimer filed Nov. 17, 1969, by the assignee, *Standard International Corporation*.

Hereby disclaims the terminal portion of the term of the patent subsequent to Dec. 8, 1981.

[*Official Gazette December 30, 1969.*]